United States Patent [19]

Swaim

[11] Patent Number: 4,794,854
[45] Date of Patent: Jan. 3, 1989

[54] FOOD PRESS WITH SEPARATING BOWL SECTIONS FOR CLEANING

[76] Inventor: C. Hall Swaim, 133 Rawson Rd., Brookline, Mass. 02146

[21] Appl. No.: 125,880

[22] Filed: Nov. 27, 1987

[51] Int. Cl.⁴ .......................... B30B 1/04; B30B 9/06
[52] U.S. Cl. .................................... 100/112; 100/125; 100/130; 100/234; D7/47; D7/101; 241/168; 99/495
[58] Field of Search .................. D7/105, 47, 372, 101; 100/125, 116, 213, 112, 234, 130; 241/95, 168, 169.2; 99/507, 510, 495, 508; 30/120.2, 120.5; 220/343

[56] References Cited

U.S. PATENT DOCUMENTS

| | | | |
|---|---|---|---|
| 1,762,031 | 6/1930 | Roberts | 100/125 X |
| 2,776,616 | 1/1957 | SArossy | D7/47 X |
| 3,036,610 | 5/1962 | Goodloe | D7/105 X |
| 4,531,457 | 7/1985 | Sivaslian | 100/234 X |
| 4,537,123 | 8/1985 | Holcomb | 100/125 |

FOREIGN PATENT DOCUMENTS 258553  2/1987  France .......................... 30/120.2

*Primary Examiner*—Andrew M. Falik
*Attorney, Agent, or Firm*—Hale and Dorr

[57] ABSTRACT

A press particularly useful as a garlic press that includes a two-piece bowl having a plurality of holes through one surface thereof (e.g. the bottom surface). The bowl is preferably hinged along one side wall so that the bowl can be opened into two separate portions connected at the hinge. Each portion of the bowl includes a plurality of grooves on the contacting edges of the two portions. An arm is connected on the side of each bowl opposite the hinge, and when the two arms are brought together, the bottom surface of the bowl is unified with the grooves forming the openings in the bottom surface. A plunger depressed over the garlic minces the garlic or other pressable article placed in the bowl. Then the bowl may be opened about the hinge so as to permit the sidwall of the openings to be exposed for easy cleaning.

12 Claims, 1 Drawing Sheet

FOOD PRESS WITH SEPARATING BOWL SECTIONS FOR CLEANING

BACKGROUND OF THE INVENTION

The present invention relates to a food press, and more particularly to a garlic or vegetable press, which is easily and efficiently cleaned.

Garlic presses in common use today generally include a bowl having small openings in one of its surfaces. One or more garlic cloves are placed in the bowl, and a plunger is depressed over the cloves within the bowl in order to exert a force sufficient to crush the garlic and to force the crushed garlic through the openings in the bowl.

While these known garlic presses more than adequately achieve the purpose for which they are designed, i.e. mincing garlic, they are very difficult to clean. The principal cleaning problem results from the fibrous and stickey garlic residue which lodges in the openings in the bowl, and such lodged residue often does not come loose when cleaned by hand or in a dishwasher. The inability to adequately clean the press may result in the press becoming a health hazard. Proper cleaning requires that the user utilize a toothpick or other object with one or more projections to clean out each and every hole in the press.

A further problem associated with known presses is that the bowls for the garlic tend to have sharp corners in which the minced garlic residue tends to accumulate and resist removal.

It is therefore a principal object of the present invention to provide a food press which is easily cleaned in a quick and sanitary manner.

A further object of the present invention is to provide a food press which will maximize the minced food produced by the press.

SUMMARY OF THE INVENTION

Accordingly, the food press of the present invention comprises a two-piece bowl having a number of holes through one surface thereof (e.g. the bottom surface). The bowl is preferably hinged along one side wall so that the bowl can be opened into two separate portions connected only at the hinge. Each portion of the bowl includes a plurality of grooves or slots on the contacting edges of the two portions. An arm is connected on the side of each bowl portion opposite the hinge, and when the two arms are brought together, the bottom and side surfaces of each portion of the bowl are unified. The openings are formed by the slots as the bottom surface is unified. A plunger depressed over the garlic or other food placed in the bowl minces the garlic. After the garlic or other food is minced, the bowl may be opened about the hinge so as to permit the sidewall of the openings to be exposed for easy removal of the garlic or other food residue. To further facilitate cleaning of the bowl and to maximize the amount of garlic or other food passed through the openings, the bowl has rounded edges at the junction of its bottom and side wall surfaces.

These and other features and objects of the present invention will be more fully understood from the following detailed description, which should be read in light of the accompanying drawings in which corresponding reference numerals refer to corresponding parts throughout the several views. Although the invention finds particular utility, and is therefore described, in the form of a garlic press, it may also take the form of a press usable with other pressable food items such as vegetables, berries, fruits and the like.

DETAILED DESCRIPTION OF THE PREFERRED EMBODIMENTS

Figure 1:
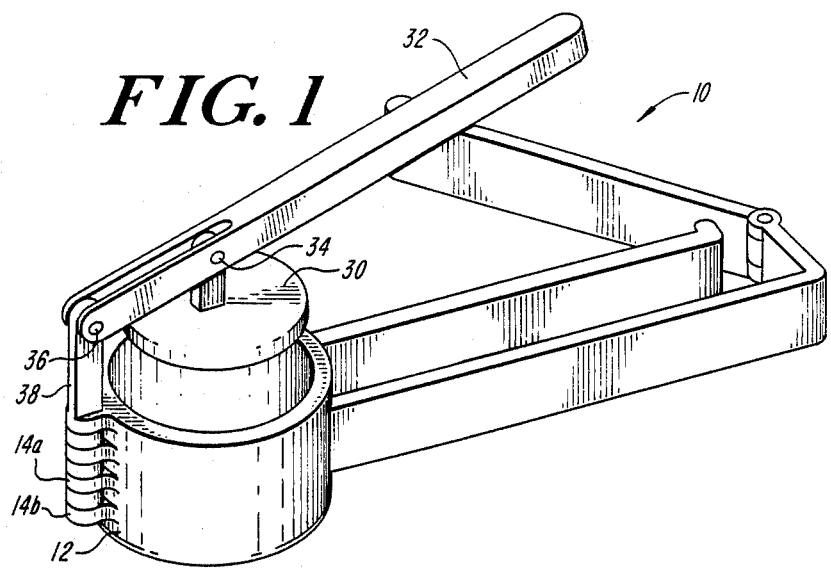
FIG. 1 is a perspective view of the press of the present invention.
Figure 2:
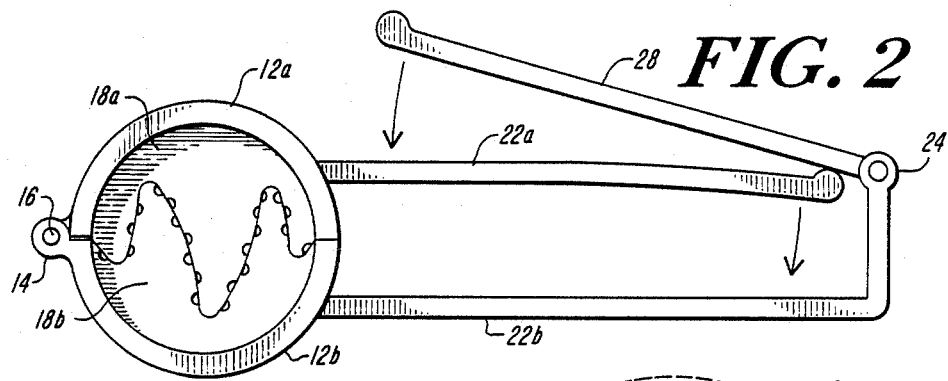
FIG. 2 is a top plan view of the press shown in FIG. 1.
Figure 4:
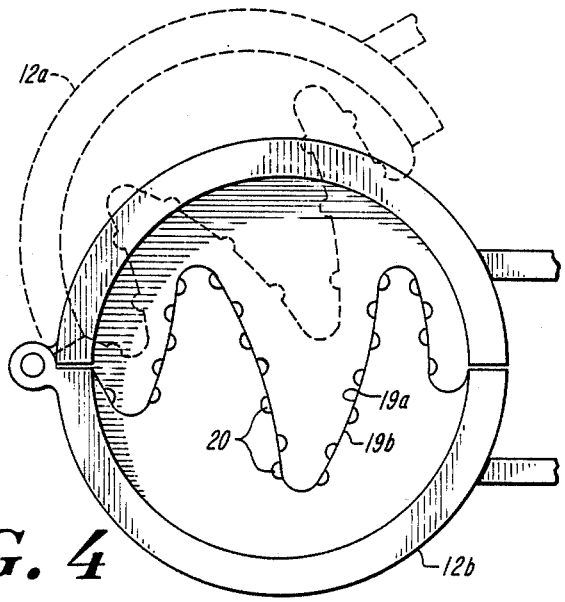
FIG. 4 is a detailed top plan view of the bowl of the garlic press of FIG. 1 with one portion of the bowl shown in phantom n an open position.

Referring to FIG. 1, the garlic press 10 of the present invention includes a bowl 12, a plunger 30, and a handle 22. The bowl 12, as most clearly shown in FIGS. 2 and 4, is divided into two sections 12a, 12b. Bowl sections 12a, 12b are connected to each other through a hinge 14 which includes hinge component 14a of bowl section 12a and hinge component 14b of bowl section 12b. A pin 16 locks the hinge components 14a, 14b for rotation around the pin 16.

Referring to FIGS. 2 and 4, the base sections 18a, 18b of bowl 12 each have a surface that complements and mates with a surface of the opposite bowl section, so that when the two surfaces are placed together, they constitute one continuous base surface. Along each edge 19a, 19b of each bowl base section 18a, 18b, a number of grooves or notches 20 are formed. The grooves or notches 20 serve as the openings in the base 18 of the garlic press when the complementing surfaces 19a, 19b are positioned adjacent each other in a mating relationship. In other words, the opposite complementary base portion serves as the wall enclosing each notch to form the opening or hole in the base of the bowl.

If the two surfaces met along a straight line the number of openings would only allow the press to produce a minimum amount of minced garlic. Therefore, to increase the number of holes 20 in the base 18, it is a preferred embodiment to provide each mating surface with a wave or tooth-shaped edge configuration that substantially increases the length of the complementing surfaces and as a result increases the number of holes and distributes them over the area of the base. Also, in a preferred embodiment, complementing surfaces are curved with their concave edges directed toward the hinge 14 to permit precision mating of said tooth-shaped base portions.

Arms 22a, 22b, attached to the side wall of each base section of 12a, 12b on the side of the bowl opposite the hinge 14, extend away from the bowl 12 in a substantially parallel fashion. As these arm sections 22a, 22b are brought together, the bowl halves 12a, 12b are rotated around the hinge 14 and are also brought together until they contact each other. In order to securely lock the bowl 12 in a closed position, the arm 22b has a right angled portion 24 the end of which includes a hinge 26. A tightening arm 28 connected to the right angled portion 24 for rotation about hinge 26 acts as a lever to urge arm 22a towards arm 24a with considerable force when arm 28 is compressed towards arm 22a thereby further securing the mated relationship between bowl sections 12a, 12b.

Figure 3:
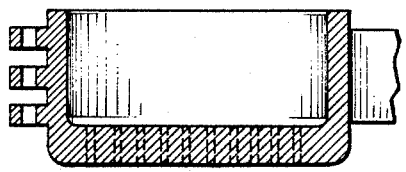
FIG. 3 is a sectional view in side elevation of the bowl of the press shown in FIG. 1.

Referring to FIG. 3, the interior of the bowl 12 is preferably shaped so that its corner edges, where the side walls meet the base, are rounded. As a result, when plunger 30 is depressed into the bowl the garlic is less likely to be trapped and retained in the corner.

The plunger 30 is hingedly connected to an arm 32 about pivot 34. The use of pivot connector 34 allows the crushing surface of plunger 30 to be maintained during use in a substantially parallel relationship with respect to the base 18 of the press 10. The arm 32 is pivotally connected to the garlic press 10 about pivot 36 which is mounted on a base 38 connected to hinge portion 14. The depressing of arm 32 causes the plunger 30 to depress within the bowl 12 thereby mincing garlic previously placed in the bowl. As the arm 32 is depressed farther, the crushed garlic is forced through openings 20.

After the garlic is minced, the plunger 30 is raised, the tightening arm 28 is released and the base sections 12a and 12b of the bowl are separated about the hinge 14 so as to expose the sidewalls of grooves 20. This exposure permits the garlic residue which ordinarily clogs the holes of known presses to be easily removed by hand or machine washing.

While these and other objects and features of the present invention will be more fully understood from the following detailed description, various alterations and modifications will occur to those skilled in the art. For example, while the complementary mating surfaces have been described as being wave or tooth-shaped they may be many other shapes as well. It should be kept in mind, however, that increasing the length of the complementing mating surfaces enables an increase in the number of holes in the press thereby increasing the effectiveness of the press. All such alterations and modifications are intended to fall within the scope of the appended claims.

What is claimed is:

1. A press for crushing and forcing a pressable substance through a plurality of openings in the press, said press comprising:
   a bowl comprised of two bowl sections with each of said sections having a mating surface complementing the mating surface of the other bowl section, each of said mating surfaces having a plurality of grooves along its complementing mating surface;
   means for securing said two bowl sections in a mated position with the grooved complementing mating surfaces of said two sections lying adjacent one another in a contacting relationship;
   means for urging the pressable substance inserted in said bowl toward openings formed by said grooves and said complementing surfaces;
   whereby a pressable substance placed in said bowl is minced when said means for urging is depressed in said bowl and said bowl is cleaned by separating said bowl sections.

2. The press of claim 1 wherein a bottom surface of said bowl comprises two sections which mate and form the openings of the press when said bowl sections are brought together in a contacting relationship.

3. The press of claim 2 wherein each of said bowl sections has a complementing mating surface with a contacting surface length greater than the diameter of said bowl.

4. The press of claim 1 wherein said two complementing mating surfaces are jagged surfaces.

5. The press of claim 1 wherein said mating surfaces are curved about a hinge joining said two bowl sections.

6. The press of claim 1 wherein each of said plurality of grooves is positioned, when said bowl sections contact each other, adjacent said other mating surface so that openings in said press are defined solely by the shape of a groove and the adjacent other mating surface.

7. The press of claim 1 wherein said means for securing said two bowl sections comprise a handle attached to each of said bowl sections with the handles extending substantially parallel from said bowl sections when said bowl sections contact each other in a mated position.

8. The press of claim 7 wherein a first one of said handles includes an extension for urging the second of said handles toward said first handle.

9. The press of claim 1 wherein said means for urging the pressable substance toward said notches comprises a plunger pivotally connected to said bowl.

10. The press of claim 1 wherein said bowl comprises a bottom surface and a side surface, the junction of said bottom and side surfaces being rounded to form a smooth edge transition between said bottom and side surfaces.

11. The press of claim 8 wherein said urging means has a bottom surface complementing and mating with said bottom and side surfaces.

12. The press of claim 1 wherein said bowl sections are connected to each other in a rotating relationship about a hinge which allows said complementing surfaces to separate from each other while said bowl sections remain connected to each other.

* * * * *